US012586260B2

(12) United States Patent
Ouyang et al.

(10) Patent No.: US 12,586,260 B2
(45) Date of Patent: Mar. 24, 2026

(54) CREATING IMAGE ENHANCEMENT TRAINING DATA PAIRS

(71) Applicant: Black Sesame Technologies Inc., San Jose, CA (US)

(72) Inventors: Jieer Ouyang, Singapore (SG); Yubo Duan, Singapore (SG)

(73) Assignee: Black Sesame Technologies (Singapore) Pte. Ltd., San Jose, CA (US)

( * ) Notice: Subject to any disclaimer, the term of this patent is extended or adjusted under 35 U.S.C. 154(b) by 135 days.

(21) Appl. No.: 18/432,989

(22) Filed: Feb. 5, 2024

(65) Prior Publication Data

US 2025/0252612 A1 Aug. 7, 2025

(51) Int. Cl.
*G06T 5/70* (2024.01)
*G06T 3/14* (2024.01)
*G06T 3/4053* (2024.01)
*G06T 5/40* (2006.01)
*G06T 5/60* (2024.01)
*G06T 5/73* (2024.01)
*G06T 7/73* (2017.01)
*G06T 7/90* (2017.01)
*G06T 11/00* (2006.01)

(52) U.S. Cl.
CPC ............... *G06T 11/00* (2013.01); *G06T 3/14* (2024.01); *G06T 3/4053* (2013.01); *G06T 5/40* (2013.01); *G06T 5/60* (2024.01); *G06T 5/70* (2024.01); *G06T 5/73* (2024.01); *G06T 7/73* (2017.01); *G06T 7/90* (2017.01); *G06T 2207/20081* (2013.01)

(58) Field of Classification Search
None
See application file for complete search history.

(56) References Cited

U.S. PATENT DOCUMENTS

| | | | | |
|---|---|---|---|---|
| 2002/0057279 A1* | 5/2002 | Jouppi | .................. | H04N 7/142 |
| | | | | 348/E7.079 |
| 2009/0033792 A1* | 2/2009 | Kano | .................... | H04N 23/60 |
| | | | | 348/E7.001 |
| 2022/0044363 A1* | 2/2022 | Zhu | .......................... | G06N 3/04 |
| 2025/0118016 A1* | 4/2025 | Hwang | .................. | G06F 3/011 |

OTHER PUBLICATIONS

Cai et al., "Toward Real-World Single Image Super-Resolution: A New Benchmark and A New Model," Presented at Proceedings of IEEE International Conference on Computer Vision 2019, Seoul, Republic of Korea, Oct. 27-Nov. 2, 2019; IEEE ICCV 2019, Nov. 2019, 10 pages.

* cited by examiner

*Primary Examiner* — Joni Hsu
(74) *Attorney, Agent, or Firm* — Fish & Richardson P.C.

(57) ABSTRACT

Methods, systems, and apparatus, including computer programs encoded on computer storage media, for generating training data for machine learning models including generating a collection of image pairs. The generation includes positioning an image capture device relative to a display device and capturing a plurality of images. Capturing each image includes displaying a high resolution image on the display device, and capturing a degraded version of the high resolution image using the image capture device. Image pairs are then generated, where each image pair includes a high resolution image and a corresponding degraded version of the high resolution image.

17 Claims, 4 Drawing Sheets

100

CREATING IMAGE ENHANCEMENT TRAINING DATA PAIRS

BACKGROUND

This specification relates to machine learning and in particular to generate datasets used to train machine learning models. Conventional machine learning models can be trained to generate a particular type of output from a given input. In one example, machine learning models can be trained to generate an enhanced image output from a degraded input image. Typically, a machine learning model is trained using a collection of training data. For example, training pairs can be used to represent known inputs and outputs. Once trained, the model generates an output in response to a given input.

SUMMARY

This specification describes technologies for generating pairs of images for use as training data to train a machine learning model. These technologies generally involve capturing degraded versions of source images and performing various transformations providing for geometric alignment and color and luminosity matching for each pair of images. A collection of image pairs associated with particular image features can form a dataset used as training data for a machine learning model configured to perform a particular machine learning task.

According to one aspect, the described techniques relate to a method for generating training data. The generation includes generating a collection of image pairs. To generate image pairs, the techniques include positioning an image capture device relative to a display device, and sequentially capturing a plurality of images. To capture each image, the described techniques include displaying a high resolution image on the display device; and capturing a degraded version of the high resolution image using the image capture device. The generated image pairs each having a high resolution image and a corresponding degraded version of the high resolution image.

To capture the degraded version of the high resolution image, the techniques can include positioning a structure between the image capture device and the display device that changes the center of focus of the image capture device. Alternatively or in addition, the techniques can include modifying ambient lighting surrounding the display device to introduce noise to the captured image. In some implementations, the system can further include modifying image capture device parameters including one or more of exposure time or ISO settings, and/or introducing motion to the image capture device to generate blurring in the captured image.

To position the image capture device relative to the display device, the described techniques can position the image capture device at a distance from the display device such that the resolution of the displayed image is a specific multiple of the resolution of the image capture device.

As another aspect, the described techniques relate to a method including receiving a collection of image pairs, each image pair comprising a high resolution source image and a captured image corresponding to a degraded version of the high resolution image. Each captured image is obtained by performing an image capture of a corresponding displayed high resolution source image. For each image pair in the collection of image pairs, the described techniques include performing pixel-level geometric alignment between the high resolution source image and the captured image, and performing color and luminance matching between the geometrically aligned high resolution source image and the captured image. A collection of geometrically aligned and color and luminance matched image pairs are then formed.

In some implementations, each captured image corresponds to a particular type of image degradation. The described techniques further include using the collection of geometrically aligned and color and luminance matched image pairs to train a machine learning model configured to generate enhanced images from input images having a degradation of the particular type.

The described techniques include one or more of denoising the input image, deblurring the image, or generating a super-resolution version of the input image.

To perform pixel-level geometric alignment, the described techniques include performing noise reduction on the captured image; performing color correction on the source image; determining adjustments for pixel-level geometric alignment between the denoised captured image and the color corrected source image; and applying the determined adjustments to the uncorrected source image. In some implementations, the techniques can include scaling the source image to match a size of the captured image.

To perform color and luminance matching, the described techniques can first separate the geometrically aligned source image into a low frequency part and a high frequency part. The described techniques can determine a ratio base between the low frequency part of the source image and the captured image. A color and luminance matching ratio between the low frequency source image and the low frequency part of the captured image can be calculated. The described techniques then apply the color and luminance ratio to the low frequency source image to form a color and luminance matched low frequency part; and combine the color and luminance matched low frequency part of the source image with the high frequency part of the source image to form a single color and luminance matched source image. The described techniques can further sharpen the high frequency part of the source image prior to combining the high frequency part with the color and luminance matched low frequency part.

To determine a color and luminance matching ratio between the low frequency part of the source image and a low frequency part of the corresponding captured image of the image pair, the techniques can perform neighbor domain mean value mapping. The neighbor domain mean value mapping can include applying a mean filter to both the low frequency part of the geometrically aligned source image as well as the low frequency part of the captured image. In some implementations, the described techniques can perform histogram mapping in which a histogram mapping curve is estimated between the low frequency part of the geometrically aligned source image and the low frequency part of the corresponding captured image. In some implementations, the descried techniques can perform edge-protection mapping in which one or more edge-protected low pass filters are applied to the low frequency part of the geometrically aligned source image and the low frequency part of the corresponding captured image.

Other embodiments of this aspect include corresponding computer systems, apparatus, computer program products, and computer programs recorded on one or more computer storage devices, each configured to perform the actions of the methods. A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions.

The subject matter described in this specification can be implemented in particular embodiments so as to realize one or more of the following advantages. Degraded images can be captured using various types of image capture devices. Suitable devices may depend on the overall application of the captured images. A structured hardware setup of a display device and an image capture device can allow for consistent image capture over a collection of images.

In contrast to capturing both images of the pair, a collection of source images can be obtained as a curated set of high quality images from which the second image of the pair is captured. This can allow for a greater variety of hardware used to capture including those image capture devices in which focal length is not adjustable. Additionally, capturing the high resolution image with a particular image capture device versus a collection of known high quality images may result in one or more artifacts in the image that will result in model training that could include such artifacts in the enhanced images.

Additionally, capturing the degraded version from the known high quality image can provide an improved collection of captured images as compared to systems that simulate the degraded images digitally. In particular, performing simulation of particular defects can be difficult without knowing all of the image signal processor characteristics.

Furthermore, capturing images using a simple image captured device such as from a mobile phone eliminates extra steps of capturing the high resolution images making the process of forming image pairs more concise and efficient.

The details of one or more embodiments of the subject matter of this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Images, including, for example, discrete images and individual video frames, can be captured using various image capture devices. The image capture devices can include digital cameras (including cameras as part of a mobile phone), image sensors, video recording devices, etc. Images captured by these devices can have varied quality due, for example, to the environment or conditions in which the images were captured. For example, an image can be noisy due to ambient lighting or device exposure. In another example, an image can be blurred due to movement of the device during image capture.

Machine learning models can be used to generate output images from a given input image, e.g., to generate an enhanced image output. Once trained, an input image can be provided to the model to generate an output image that has been enhanced according to the specific configuration of the machine learning model. The image enhancement of an input image can be, for example, to generate a deblurred, denoised, or super-resolution version of the input image. In some implementations, a training data set for training a machine learning model includes image pairs. Each image pair can correspond to a high resolution version and a degraded version of a scene.

This specification describes technologies for generating pairs of images according to particular image properties to form a dataset. The dataset can be used as training data for a particular machine learning task based on the image properties. In particular, this specification describes generally capturing degraded versions of high resolution source images and performing various transformations to align each pair of images for use as a training pair. Geometric alignment as well as color and luminance matching can be performed on the source images to ensure pixel-wise consistency between the source images and the captured degraded images. One or more sets of training data pairs can be formed for each type of enhancement task. Corresponding sets are then used to train a machine learning model to one or more image enhancement tasks including, for example, denoising or deblurring tasks.

Figure 1:
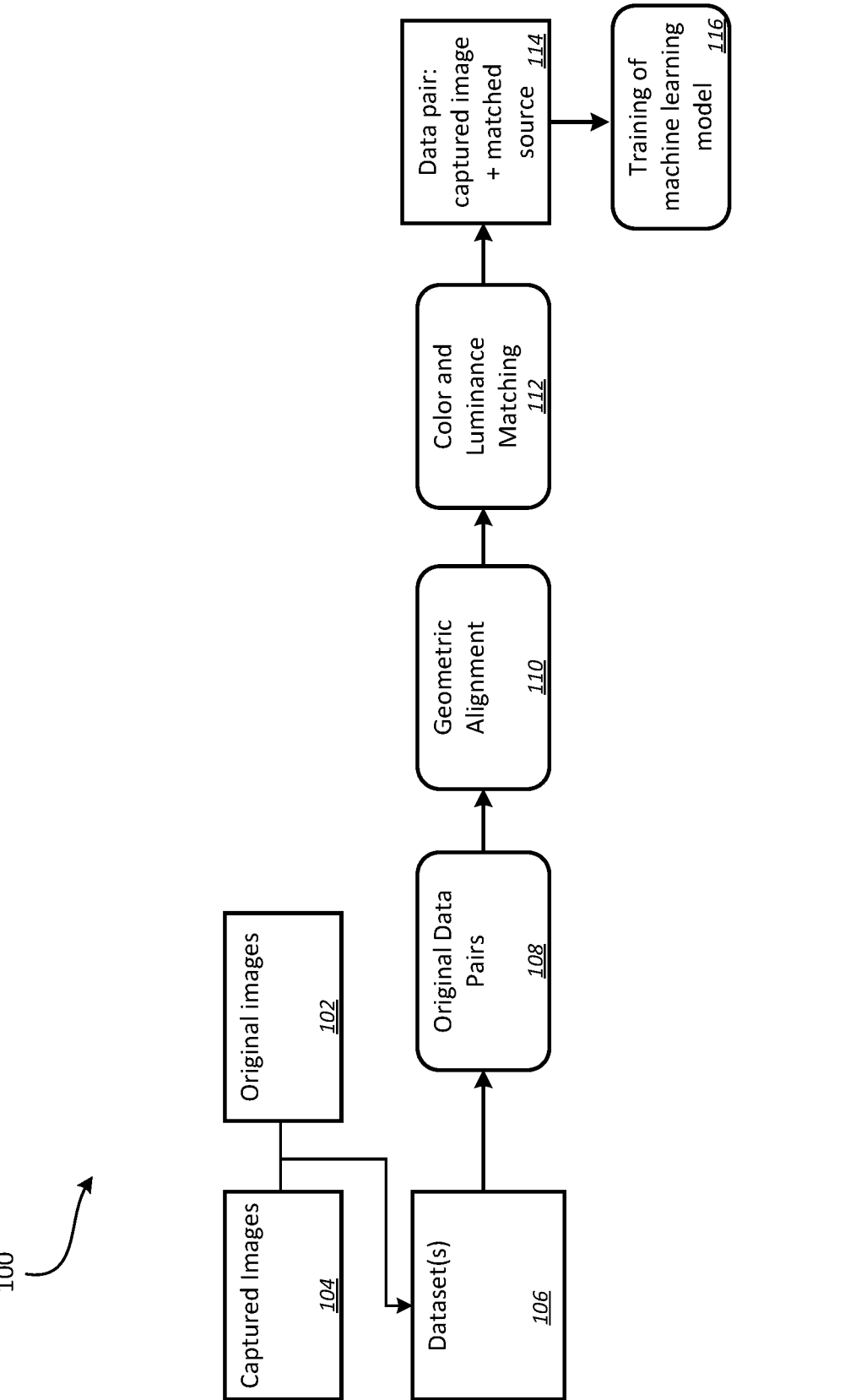
FIG. 1 is a diagram of an example architecture for generating and aligning training data pairs.

FIG. 1 is a diagram of an example architecture 100 for generating and aligning training data pairs. The architecture 100 includes original, or source images 102 and captured images 104. The source images 102 are high quality images from which a corresponding degraded image is captured. For example, the source images 102 can be high resolution images that have been evaluated as high quality images meeting resolution criteria as well as determined to be within noise and blur tolerances. Each captured image 104 is a degraded version of a corresponding source image 102. For example, a particular source image 102 can be displayed on a display device. An image of the displayed source image 102 can then be captured by an image capture device such as a camera. A collection of source image 102 and captured image 104 pairs can form a particular dataset 106. Different datasets 106 can be generated. For example, each dataset 106 can include captured images 104 having one or more particular characteristics, such as introduced noise or blurring. An example system for capturing images of source images is described below with respect to FIG. 2.

The image pairs within a particular dataset 106 are processed to generate a collection of geometrically aligned and color and luminance matched pairs of images 114 that can be provided as training data, e.g., to train a machine learning model 116. Original image pairs 108 from the dataset 106 undergo geometric alignment 110 and color and luminance matching 112 to form pixel-level aligned pairs 114. In particular, for geometric alignment 110, the source image of each pair is modified to provide pixel-level alignment with the corresponding captured image. For color and luminance matching 112, the source image of each pair is modified to provide color and luminance matching with the captured image to ensure that there are no systematic color or luminance differences between the source and captured images. Geometric alignment 110 is described in more detail with respect to FIG. 3. Color and luminance matching 112 is described in more detail with respect to FIG. 4.

Dataset Creation

Datasets of image pairs can be generated for training models to perform different machine learning tasks. For example, image pairs can be created in which one image of the pair exhibits a feature being trained for enhancement by the machine learning model. In some implementations, a particular dataset is generated for training a machine learning model to perform a single image enhancement task. In some alternative implementations, a single dataset can be used to train a machine learning model configured to perform one or more different image enhancements.

Figure 2:
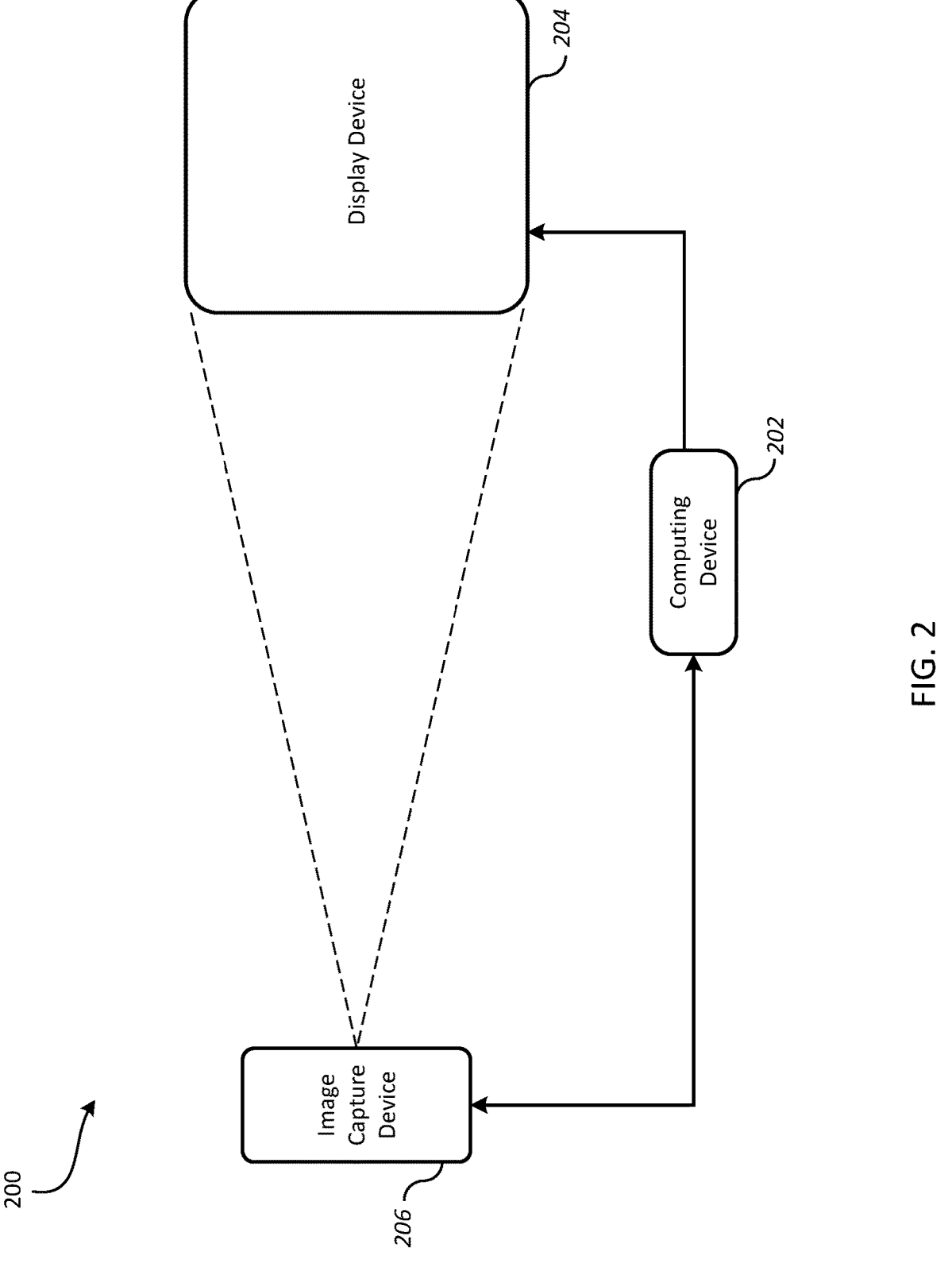
FIG. 2 is a diagram illustrating an example image capture system.

FIG. 2 is a diagram illustrating an example image capture system 200. The image capture system 200 includes a computing device 202, a display device 204, and an image capture device 206. The computing device 202 is communicatively coupled with both the display device 204 and the image capture device 206, e.g., through wired and/or wireless communication signals.

The display device 204 can be a stand alone display such as an LCD or CRT monitor or television display. In some implementations, the display device 204 is integrated within another device, for example, a computer. The image capture device 206 can be a camera device or a camera within another device, for example, as part of a mobile phone. While the computing device 202, image capture device 206, and display device 204 are illustrated as distinct components, in some implementations, one or more of the computing device 202, display device 204, and image capture device 206 can be integrated together. For example, the display device 204 may be integrated as part of the computing device 202, e.g., the display of a laptop computer acting as the computing device. In another implementation, the image capture device 206 can be a camera coupled to the computing device 202 as a peripheral device, e.g., a webcam device.

The computing device 202 is configured to control the display of images on the display device 204. For example, the computing device 202 can include, e.g., in memory, or be coupled to an external memory or data storage device, a collection of high resolution images to be used as a source image of image pairs in the dataset being generated. The high resolution images can be considered ground truth images that represent a desired image enhancement output in a trained machine learning model.

The computing device 202 is further configured to instruct the image capture device 206 to capture images. In particular, the image capture device 206 is positioned to capture a region of the display device 204 corresponding to the display area of the images provided to the display device 204 from the computing device 202. Thus, the image capture device 206 captures an image corresponding to an image currently being displayed on the display device 204. In some implementations, the image capture device 206 is assigned to a particular position that reduces or eliminates the appearance of moiré patterns in the captured images of the display device 204.

Positioning the image capture device 206 can include mounting the image capture device at a specified location to maintain a particular position relative to the display device 204. For example, based on the default field of view of the image capture device 206, the distance from the display device 204 as well as the height of the image capture device 206 can be determined so that the field of view corresponds to the displayed image on the display device 204. In some implementations, the display dimensions are determined in part based on the image capture device 206 being used and the position to calibrate the field of view being captured with the display size of the image. In some other implementations, the display resolution on the display device 204 is specified to provide particular image capture characteristics, as described in more detail below.

In some alternative implementations, control signals from the computing device 202 provide for control of one or more image capture parameters of the image capture device 206, for example, exposure settings or optical and digital zoom.

In some implementations, the image capture device 206 is mounted to a structure that is controllable to provide particular image capture characteristics. In addition, other environmental parameters can be controlled, e.g., manually or through the computing device 202. For example, a lightbox can be positioned relative to the display device 204 and adjusted to control ambient lighting.

In some implementations, to generate a dataset for training an image enhancement model configured to correct image blurring, the captured images can be blurred images of the displayed image. The blurring can be introduced, for example, by vibrating the image capture device during image capture, with or without an adjustment to exposure time. For example, the image capture device 206 can be mounted to a structure that can be randomly vibrated to introduce a motion blur to captured images. In another implementation, a clear object can be positioned between the image capture device 206 and the display device 204. This image capture device may then focus on the clear object rather than the image displayed on the display device 204. The corresponding blurring from being out of focus can then be captured by the image capture device 206.

In some implementations, movement can be introduced into the displayed image rather than the image capture device 206 to generate the motion blurring of the captured image. For example, a displayed image can instead be a video of the image in which different frames include some small movements of the image on the display device 204, which is then captured by the image capture device 206.

In another example, to generate a dataset for training an image enhancement model configured to correct noise from input images, the captured images can each be images of the displayed image such that noise is introduced into the captured image. For example, the ambient lighting can be adjusted, e.g., dimmer environments can increase noise in the captured image. For example, a lightbox surrounding the display device 204 can be dimmed to provide a lower ambient light environment and/or the display device brightness can be reduced. In some implementations, the image capture parameters are modified, e.g., increased exposure time (shutter speed) or increased ISO sensitivity resulting in added noise in the captured image. For another example, a variable digital filter can be placed between the image capture device 206 and the display device 204. By adjusting the range of the filter, the noise condition of the images captured by the image capture device 206 varies as well.

In another example, to generate a dataset for training an image enhancement model configured to generate super-resolution images, the captured images can each have a lower resolution than the corresponding displayed image. For example, the resolution of the displayed image can be a particular multiple of the resolution of the captured image, e.g., 5×, or 10×, depending on the requirements of the image enhancement model. One example technique for obtaining particular resolution levels is to adjust the distance between the image capture device 206 and the display device 204 to produce a specified magnification ratio between the size of the image displayed on the display device 204 and the size of images captured by the image capture device 206. In particular, the pixel level of the display device 204 should be higher than the pixel level of the image capture device 206 to ensure that detail is not lost due to lower display pixel level. In one example, the display device 204 can present images with pixel size 3000×4000. The distance to the image capture device 206 can be set so that the size of the image as captured by the image capture device 206 has a pixel size of around 1500×2000. Thus, the model can be trained to upscale the input images by 2×. A range of pixel size ratios can be used to provide a greater enhancement range.

The computing device 202 is further configured to provide instructions to the image capture device 206 to relay captured images back to the computing device 202. The computing device 202 coordinates operations of the display device 204 and the image capture device 206 so that for each image displayed on the display device 204 one or more images are captured by the image capture device 206. For example, a command sequence can include an instruction to present an image on the display device 204, an instruction to capture an image of the presented image on the display device 204, and an instruction to present a next image on the display device 204. An instruction to send the captured images to the computing device 202 can be individually sent after each image capture, or can be sent as a batch of all captured images after a last image is captured by the image capture device 206.

In some implementations, multiple images can be captured for a single displayed image on the display device 204. When capturing multiple images, adjustments can be made between individual captures of the displayed image, to generate images for the dataset having variations in characteristics related to the task to be performed by the image enhancement model. For example, adjustments made between image captures of the same displayed image can include displacement, luminance variation, etc. The adjustments can be mechanical adjustments to the environments or simulated adjustments applied to the image being displayed, e.g., changes in image brightness or displacements by specified numbers of pixels.

The computing device 202 then pairs each captured image with the corresponding displayed image (source image) to create an image pair for the dataset. In implementations where multiple images are captured for a single displayed image, copies of the displayed image can be generated so that respective copies are paired with the captured images. Alternatively, the image pairs can be stored as a data structure where multiple images reference the same source image.

The collection of image pairs can form an initial dataset. The dataset can be further processed as described below with respect to FIGS. 3-4 to form a final dataset. The further processing can include performing one or more transformations on the source images of each pair in the dataset including geometric alignment and color and luminance matching.

Figure 3:
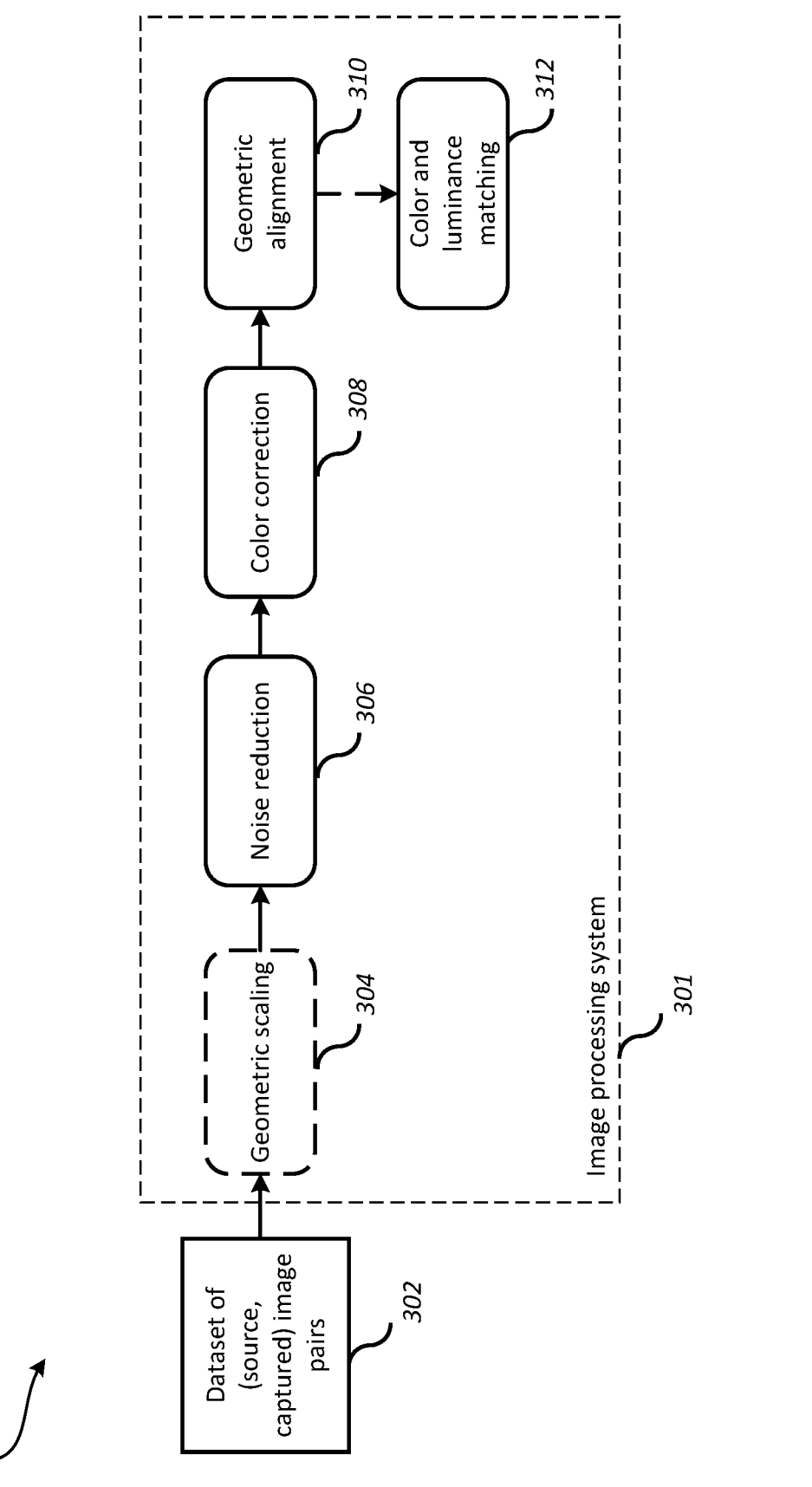
FIG. 3 is a flow diagram of an example process for performing geometric alignment.
Figure 4:
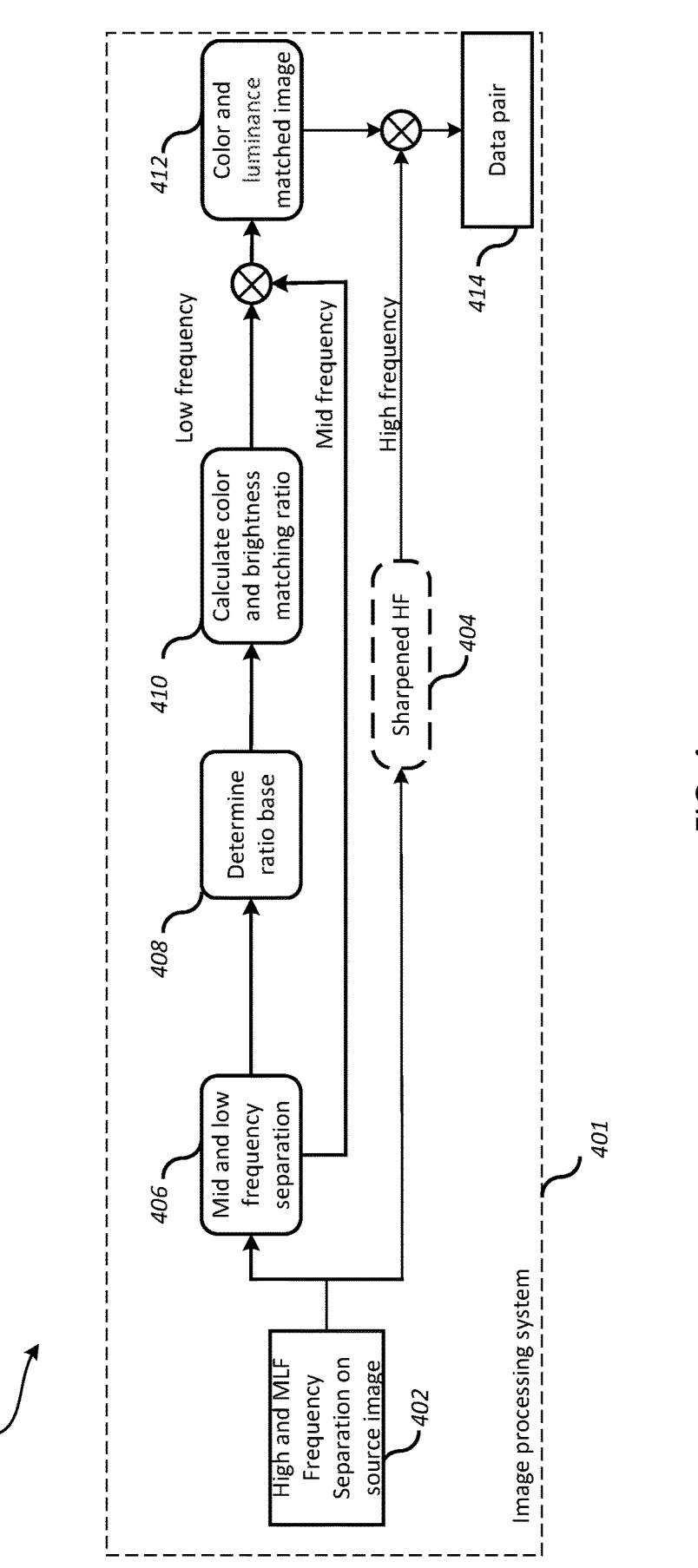
FIG. 4 is a flow diagram of an example process for performing color and luminance alignment.

Image enhancement models may require pixel-level alignment between the images in each training pair of images. To ensure that the training data pairs are aligned, operations are performed on the source images to ensure that they are pixel-level aligned with the corresponding captured image of the pair. In some implementations, operations can be performed on the captured images instead of the source images. FIG. 3 describes an example process for performing geometric alignment on each of the source images. FIG. 4 describes an example process for performing color and luminance matching on the source images.

Geometric Alignment

FIG. 3 is a flow diagram of an example process 300 for performing geometric alignment. For convenience, the process 300 will be described as being performed by a system of one or more computers, located in one or more locations, and programmed appropriately in accordance with this specification. For example, an image processing system 301 in FIG. 3 can perform the process 300.

The system receives image pairs of a particular original dataset 302. The image pairs include a high resolution source image and a corresponding degraded image. The degraded image is a version of the source image that has been captured or modified to effect a particular characteristic based on image enhancement task, e.g., with introduced noise, blur, or scaled down resolution. The image pairs can be generated as described above with respect to FIG. 2.

For each image pair, the system performs a geometric alignment operation to provide pixel-level alignment between the source and captured images of the pair. The geometric alignment operation will be described with respect to a first pair of images.

The system scales the source image (304). The size ratio between the source image and capture images may not match. The system performs geometric scaling on the source image to match that of a particular size value. This can be a size that matches the size of the captured images. For example, using the techniques described above with respect to FIG. 2, the captured images may be captured at a particular size, e.g., image width and length in pixels. A number of different scaling algorithms can be used to change the image size by a particular scaling amount including interpolation, resampling, sampling, transform, vectorization, and machine learning techniques. Suitable scaling techniques can be selected based on the types of images, image scaling amounts, and quality of scaling needed, e.g., need to limit artifacts such as aliasing.

In some other implementations, the geometric scaling can be performed on both the source and the captured images to ensure they have the same specified size. For example, in one implementation the captured image is scaled up two times while the source image is scaled down to match. This way, the images of the pair are matched roughly in the middle of scaling. In some implementations, the geometric scaling is optional because all of the source images have the same scaling that is matched with the captured images.

The system performs noise reduction on the captured image (306). The noise reduction is performed on the scaled captured image if geometric scaling is performed. The noise reduction is performed to improve the accuracy of the geometric alignment between the two images. In some implementations, the image captured device captures multiple image frames as part of capturing an image. For example, a mobile phone camera often captures multiple frames as part of a single request to take a photo. In such instances, the noise reduction can be performed by averaging the multiple frames of the captured image to obtain a denoised captured image. Although the described techniques perform noise deductions using multi-frame images, which can be more accurate than using a single image frame, the described techniques are capable of performing noise reduction by using a single image frame. More specifically, the described techniques can include one or more denoising algorithms, for example, NLM, BM3D, or deep learning denoising models, to reduce noise, as long as the selected algorithm can maintain main texture features of the image.

Other denoising algorithms can be implemented as long as they can maintain the main textures of the original images since the denoised images are only used for alignment purposes.

The system performs color correction on the source image (308). During color correction, the color and brightness of the source image (or scaled source image if geometric scaling is performed) are adjusted to match the denoised captured image of the pair. In some implementations, the color correction is performed using histogram mapping to update the source image color and brightness values to match those in the captured image. For example, histograms of RGB channels can be used for performing the color matching of the individual red, green, and blue components of the source image. A luminosity histogram can be used for performing the brightness matching of the source image.

The system performs geometric alignment between the denoised captured image and the color corrected source image (310). In particular, the color corrected source image is spatially adjusted to match the denoised captured image on the pixel level. In some implementations, optical flow mapping and homography are performed on the color corrected source image. The determined adjustments to align the images are then performed on the original (non-corrected) source image of the pair. The geometric image alignment can also be referred to as image registration.

Estimated optical flow mapping is used to estimate the motion of pixels between images. Techniques can be used to compute flow vectors between reference frame pixels, e.g., denoised captured image and the target frame pixels, e.g., the color corrected source image. Each flow vector indicates a direction and magnitude of a change in pixel position between the two images. The flow vectors are then used to determine adjustments to apply to the color corrected source image to match the denoised captured image. Optical flow mapping may be dense or sparse, where sparse optical flow determines flow vectors for particular regions of an image rather than the whole image. Example techniques for computing optical flow include Lucas-Kanade, Horn-Schunck, Farneback, and a suitable technique can be selected to determine the optical flow between the denoised captured image and the color corrected source image.

Homography provides a perspective transformation for two dimensional images to align the spatial relationship between the perceived observer and the image, e.g., to ensure that the source image and the captured image represent views from the same observer location. A homography matrix provides a transformation matrix for shifting points from the viewpoint of the denoised captured image to the viewpoint of the color corrected source image such that the two images have an aligned perspective.

The optical flow mapping and homography operations may not need to be performed on every pair of images. In some implementations, one or more (color corrected source images, denoised captured images) pairs are set as calibration images. An average value of the optical flow maps and/or the homography matrices, which are derived from the calibration images. These values can then be applied to other image pairs to perform the geometric alignment.

In some implementations, the dataset of (color corrected source image, denoised captured image) pairs is split into multiple groups. Calibration images can be determined for each group and the average value of the optical flow maps and/or the homography matrices are applied to image pairs of the group. In such implementations, large displacements determined in the calibration images can lead to a particular group being filtered out. The relative amounts of displacements can be determined, for example, based on comparisons of adjacent groups. If the mean absolute value of the optical flow map vector exceeds a certain amount, e.g., one pixel, that indicates vibration might take place in that group, therefore the data of the whole group could be filtered out. Similarly, homography estimation could be conducted between calibration images of adjacent groups as well. If the mean shifting value of the homography exceeds a certain amount, that group could be filtered out.

Using the information determined from the optical flow and homography as applied to the color corrected source image and captured images, the adjustments are applied to the original source image of each pair. The aligned pairs of captured images and source images provide an aligned dataset that can be further processed. For example, the system then performs color and luminance matching on the geometrically aligned image pairs (312).

Color and Luminance Matching

FIG. 4 is a flow diagram of an example process 400 for performing color and luminance alignment. For convenience, the process 400 will be described as being performed by a system of one or more computers, located in one or more locations, and programmed appropriately in accordance with this specification. For example, an image processing system 401 in FIG. 4 can perform the process 400.

The system performs frequency separation on the geometrically aligned source image (402). Frequency separation allows for the separation of different features of an image. For example, Fourier transforms can be used to convert image components into discrete frequencies or frequency groups. The separated components can be independently processed. For example, to separate color information from other details of an image. Typically, the high frequency components include the fine details within the image such as lines and textures. The low frequency components include image information such as color and tone. Techniques for frequency separation include, for example, conducting Gaussian blur, bilateral filter, or guided filter on the input the image to get the low frequency part and then performing a subtraction between the original aligned source image and the generated blurred image to get the high frequency part. The filter to be used can depend on the particular types of features in the images of the dataset and evaluation of the output quality. In particular, the particular frequency separation used can separate the aligned source image into a high frequency part and a mid to low frequency part ("MLF"). The described techniques can adopt different quantifications to classify "low," "mid," and "high" frequencies of an image. For example, the described techniques can classify frequencies based on the texture size in a particular image. In this example, "low" frequencies can include textures or features with characteristic sizes between a single pixel to a couple of pixels (e.g., 2, 3, 5 pixels, etc.), "mid" frequencies can have characteristic sizes between several pixels to ten or twenty pixels, and "high" frequencies can have characteristic sizes greater than twenty pixels.

The system optionally sharpens the high frequency part of the aligned source image (404). In some implementations, the high frequency part is scaled up a specified amount for performing sharpening. Different sharpening techniques can be used, for example, an unsharp mask that increases edge contrast. Since the high frequency part includes the fine lines and other edge features, it is suitable for sharpening the line features of the image.

The system further separates the MLF part into a low frequency and mid frequency parts (406). The mid and low frequency parts can be separated in a similar manner as described above for separating the high and MLF parts. Additionally, in some implementations, this is part of the frequency separation performed at (402) rather than a separate subsequent step.

The system determines a ratio base between the source image and the captured image (408). Determining the ratio base includes matching the pixel size of the low frequency source image with the captured image. Based on any scaling differences, one of the images is modified, but not both. Thus, if there is a difference in scale between the source and captured image, one can be resized to match the other before continuing with the color and luminance matching. If they are the same size, no modification is necessary.

The system calculates a color and luminance matching ratio (410). After attaching the ratio base, a ratio map is calculated between the low frequency source image and the low frequency part of the captured image. The color and luminance matching ratio for the low frequency part of the source image is calculated according to Formula 1, below:

$$Mapped\_GT = \frac{IN\_LF}{GT\_LF + Base} \times (GT + Base) \qquad \text{Formula 1}$$

where "Mapped_GT" refers to the color and luminance matching ratio, "IN_LF" refers to low frequency part of the captured image, "GT_LF" refers to low frequency part of the source image, "GT" refers to geometrically aligned source image, and "Base" refers to a base value. A certain base value is added to both the numerator and denominator of formula 1, to avoid the case where the low frequency part of the source image is zero leading to an undefined result. In some implementations, the base value is 10 or less (for bitmap image ranged 0~255).

The system can determine the color and luminance matching ratio (ratio base) between the low frequency part of the geometrically aligned source image and the low frequency part of the corresponding captured image of the image pair using different techniques. Similar to those described above with respect to the source image, the system can implement techniques including, e.g., histogram mapping, neighbor domain mean value mapping, or edge-protection mapping.

In histogram mapping, a histogram mapping curve is estimated between the low frequency source image and the captured image. The estimated histogram curve is applied on to the low frequency part of the geometrically aligned high resolution source image to obtain a color-mapped result, e.g., based on individual RGB histograms.

In neighbor domain mean value mapping, a mean filter is applied onto both the low frequency part of the geometrically aligned high resolution source image as well as the corresponding captured image of the pair. In edge-protection mapping, edge-protected low pass filters including, e.g., bilateral filter or guided filter, are applied to the low frequency part of both the geometrically aligned high resolution source image and the captured image. Similar to the neighbor domain mean value mapping, a ratio map is then calculated and applied onto the low frequency part of the source image.

The system applies the color and luminance ratio to the low frequency source image combined with the mid frequency source image to generate a color and brightness matched low frequency source image (412). In some implementations, applying the color and luminance ratio to the low frequency source image includes applying the color value and luminance value of the low frequency source image pixel-by-pixel to the calculated ratio, e.g., multiplying the respective values by the calculated ratio.

The system combines the color and luminance matched low/mid frequency source image with the high frequency (and optionally sharpened) source image to form a final matched source image that is paired with the corresponding captured image (414). This generates a final data pair of the dataset that is geometrically aligned and color and luminance matched. The process is performed for each pair in the dataset to generate a final dataset of pixel-wise geometric, color, and luminance aligned data pairs. The final dataset can then be used as training data for one or more machine learning models being trained, for example, to perform image enhancement.

Training a Machine Learning Model

Training the machine learning model can include using the training data of the data set to optimize parameters of the machine learning model based on image inputs, represented by the captured images of the pairs to obtain an enhanced output result, represented by the source image of the pairs. Different types of machine learning models can be used to perform image enhancement including neural network models such as convolutional neural networks or attention based neural networks.

In some implementations, training includes generating a particular machine learning model. The system generates a machine learning model. The machine learning model can be based on one or more existing machine learning models as a foundation and configured to use specific training data and hyperparameters to train the model for performing a particular task. In particular, the particular task can be related to image processing e.g., denoising, deblurring, or generating super-resolution images. One or more machine learning models can be trained for performing this particular task using corresponding image pairs as described in this specification. The output generated by the trained one or more machine learning models can include, e.g., denoised, deblurred, or images with super-resolution for input images.

The training system trains the machine learning model using particular training data, for example, a particular dataset configured for training a machine learning model to perform the particular type of enhancement. The dataset can be obtained, for example, though the processes described above with respect to FIGS. 1-4. In some implementations, the obtained training data is used as input to a training engine that trains a machine learning model based on the training data and a set of model parameter values.

As part of the model training, the training data is iteratively processed to optimize one or more model parameter values. The training system can generate, for each image pair of the training dataset, one or more output image predictions. The training system analyzes the output image predictions and compares the output image predictions to the known output image of the pair, i.e., the ground truth high resolution image. The training system then updates one or more model parameter values based on the results of the comparison, for example, by using an appropriate updating technique, e.g., stochastic gradient descent with backpropagation. Once the machine learning model is trained, the final set of parameters can be used to generate predicted output images based on a given degraded input image. For example, a blurred image can be input to the machine learning model configured to perform deblurring and generate a predicted deblurred version of the image. Embodiments of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible non-transitory storage medium for execution by, or to control the operation of, data processing apparatus. The computer storage medium can be a machine-readable storage device, a machine-readable storage substrate, a random or serial access memory device, or a combination of one or more of them. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus.

The term "data processing apparatus" refers to data processing hardware and encompasses all kinds of apparatus, devices, and machines for processing data, including by way of example a programmable processor, a computer, or multiple processors or computers. The apparatus can also be, or further include, special purpose logic circuitry, e.g., an FPGA (field programmable gate array) or an ASIC (application-specific integrated circuit). The apparatus can optionally include, in addition to hardware, code that creates an execution environment for computer programs, e.g., code that constitutes processor firmware, a protocol stack, a database management system, an operating system, or a combination of one or more of them.

A computer program, which may also be referred to or described as a program, software, a software application, an app, a module, a software module, a script, or code, can be written in any form of programming language, including compiled or interpreted languages, or declarative or procedural languages; and it can be deployed in any form, including as a stand-alone program or as a module, component, subroutine, or other unit suitable for use in a computing environment. A program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub-programs, or portions of code. A computer program can be deployed to be executed on one computer or on multiple computers that are located at one site or distributed across multiple sites and interconnected by a data communication network.

The processes and logic flows described in this specification can be performed by one or more programmable computers executing one or more computer programs to perform functions by operating on input data and generating output. The processes and logic flows can also be performed by special purpose logic circuitry, e.g., an FPGA or an ASIC, or by a combination of special purpose logic circuitry and one or more programmed computers.

Computers suitable for the execution of a computer program can be based on general or special purpose microprocessors or both, or any other kind of central processing unit. Generally, a central processing unit will receive instructions and data from a read-only memory or a random access memory or both. The essential elements of a computer are a central processing unit for performing or executing instructions and one or more memory devices for storing instructions and data. The central processing unit and the memory can be supplemented by, or incorporated in, special purpose logic circuitry. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

Computer-readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's device in response to requests received from the web browser.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface, a web browser, or an app through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network (LAN) and a wide area network (WAN), e.g., the Internet.

The computing system can include clients and servers. A client and server are generally remote from each other and typically interact through a communication network. The relationship of client and server arises by virtue of computer programs running on the respective computers and having a client-server relationship to each other. In some embodiments, a server transmits data, e.g., an HTML page, to a user device, e.g., for purposes of displaying data to and receiving user input from a user interacting with the device, which acts as a client. Data generated at the user device, e.g., a result of the user interaction, can be received at the server from the device.

While this specification contains many specific implementation details, these should not be construed as limitations on the scope of any invention or on the scope of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially be claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In some cases, multitasking and parallel processing may be advantageous.

What is claimed is:

1. A method comprising:
generating a collection of image pairs comprising:
    positioning an image capture device relative to a display device;
    capturing a plurality of images, wherein capturing each image comprises:
        displaying a high resolution image on the display device; and
        capturing a degraded version of the high resolution image using the image capture device; and
    generating image pairs, each image pair comprising a high resolution image and a corresponding degraded version of the high resolution image,
    wherein positioning comprises positioning the image capture device at a distance from the display device such that a resolution of the displayed high resolution image is a specific multiple of a resolution of the image capture device.

2. The method of claim 1, wherein capturing the degraded version of the high resolution image comprises:
positioning a structure between the image capture device and the display device that changes a center of focus of the image capture device.

3. The method of claim 1, wherein capturing the degraded version of the high resolution image comprises:
modifying ambient lighting surrounding the display device to introduce noise to the captured image.

4. The method of claim 1, wherein capturing the degraded version of the high resolution image comprises:
modifying image capture device parameters comprising one or more of exposure time or ISO settings.

5. The method of claim 1, wherein capturing the degraded version of the high resolution image comprises:
introducing motion to the image capture device to generate blurring in the captured image.

6. A method comprising:
receiving a collection of image pairs, each image pair comprising a high resolution source image and a captured image corresponding to a degraded version of the high resolution source image, and wherein each captured image is obtained by performing an image capture of a corresponding displayed high resolution source image;
for each image pair in the collection of image pairs:
    performing pixel-level geometric alignment between the high resolution source image and the captured image to generate a geometrically aligned high resolution source image, and
    performing color and luminance matching between the geometrically aligned high resolution source image and the captured image, wherein performing the color and luminance matching comprises:
        separating the geometrically aligned high resolution source image into a low frequency part and a high frequency part;
        determining a ratio base between the low frequency part of the geometrically aligned high resolution source image and the captured image;
        calculating a color and luminance matching ratio between the low frequency part of the geometrically aligned high resolution source image and the low frequency part of the captured image based on the ratio base;
        applying the color and luminance matching ratio to the low frequency part of the geometrically aligned high resolution source image to form a color and luminance matched low frequency part; and
        combining the color and luminance matched low frequency part of the geometrically aligned high resolution source image with the high frequency part of the geometrically aligned high resolution source image to form a single color and luminance matched source image; and
    forming a collection of geometrically aligned and color and luminance matched image pairs.

7. The method of claim 6, wherein each captured image corresponds to a particular type of image degradation, the method further comprising:
using the collection of geometrically aligned and color and luminance matched image pairs to train a machine learning model configured to generate enhanced images from input images having a degradation of the particular type.

8. The method of claim 7, wherein generating the enhanced image from the particular input image comprises one or more of denoising the particular input image, deblurring the particular input image, or generating a super-resolution version of the particular input image.

9. The method of claim 6, where performing the pixel-level geometric alignment comprises:
performing noise reduction on the captured image to generate a denoised captured image;
performing color correction on the high resolution source image to generate a color corrected source image;
determining adjustments for pixel-level geometric alignment between the denoised captured image and the color corrected source image; and applying the determined adjustments to the high resolution source image.

10. The method of claim 9, further comprising:

scaling the high resolution source image to match a size of the captured image.

11. The method of claim 6, further comprising:

sharpening the high frequency part of the geometrically aligned high resolution source image prior to combining the high frequency part with the color and luminance matched low frequency part.

12. The method of claim 6, wherein determining the color and luminance matching ratio comprises performing neighbor domain mean value mapping, the neighbor domain mean value mapping comprising applying a mean filter to both the low frequency part of the geometrically aligned high resolution source image as well as the low frequency part of the captured image.

13. The method of claim 6, wherein determining the color and luminance matching ratio comprises performing histogram mapping in which a histogram mapping curve is estimated between the low frequency part of the geometrically aligned high resolution source image and the low frequency part of the corresponding captured image.

14. The method of claim 6, wherein determining the color and luminance matching ratio comprises performing edge-protection mapping in which one or more edge-protected low pass filters are applied to the low frequency part of the geometrically aligned high resolution source image and the low frequency part of the corresponding captured image.

15. A system comprising one or more computers and one or more storage devices storing instructions that when executed by one or more computers cause the one or more computers to perform respective operations, the operations comprising:

generating a collection of image pairs comprising:

positioning an image capture device relative to a display device;

capturing a plurality of images, wherein capturing each image comprises:

displaying a high resolution image on the display device; and capturing a degraded version of the high resolution image using the image capture device; and generating image pairs, each image pair comprising a high resolution image and a corresponding degraded version of the high resolution image, wherein positioning the image capture device relative to the display device comprises positioning the image capture device at a distance from the display device such that a resolution of the displayed high resolution image is a specific multiple of a resolution of the image capture device.

16. The system of claim 15, wherein capturing the degraded version of the high resolution image comprises:

positioning a structure between the image capture device and the display device that changes a center of focus of the image capture device.

17. The system of claim 15, wherein capturing the degraded version of the high resolution image comprises:

modifying ambient lighting surrounding the display device to introduce noise to the captured image.

* * * * *